Figure 8:
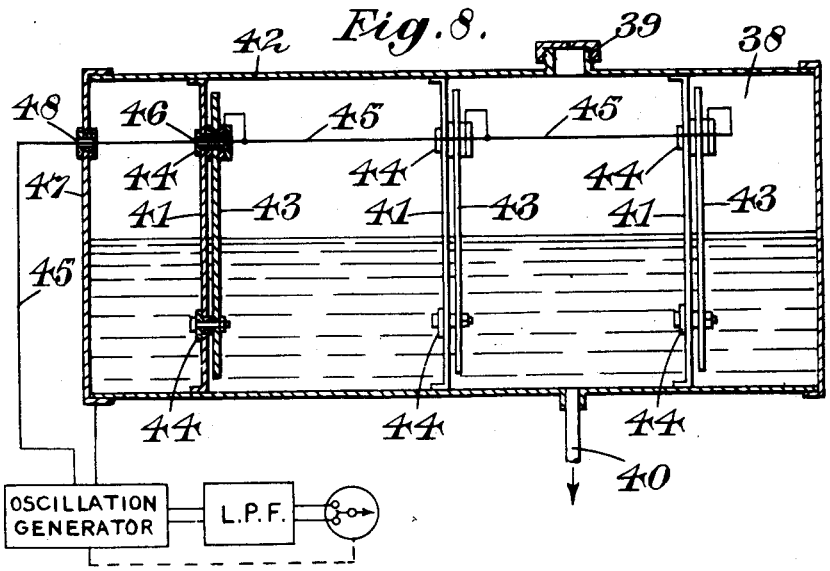

April 21, 1942.  H. WAYMOUTH  2,280,678
APPARATUS FOR THE MEASUREMENT OF ELECTRICAL REACTANCES
Filed May 28, 1938   2 Sheets—Sheet 1
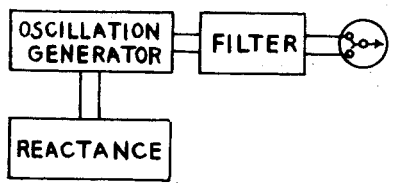
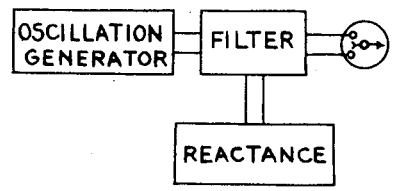
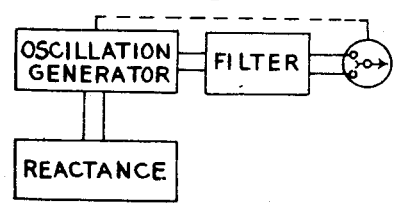
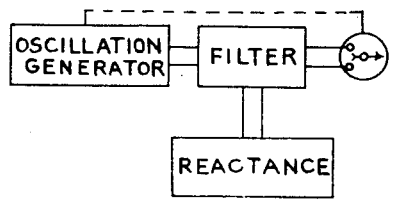
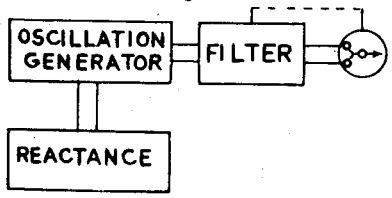
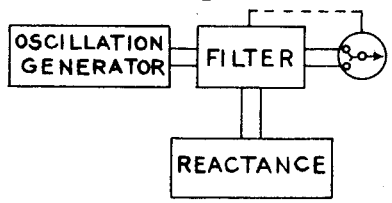
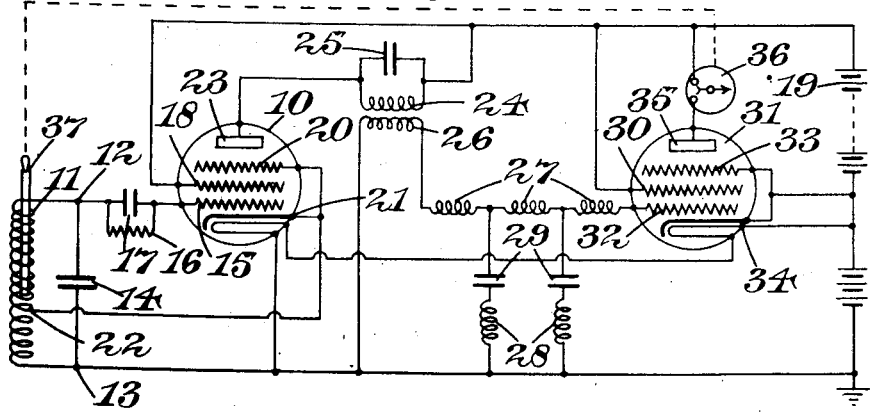
INVENTOR
HENRY WAYMOUTH
By Stebbins, Blenko & Parmelee
ATTORNEYS April 21, 1942.  H. WAYMOUTH  2,280,678
APPARATUS FOR THE MEASUREMENT OF ELECTRICAL REACTANCES
Filed May 28, 1938  2 Sheets-Sheet 2

INVENTOR
HENRY WAYMOUTH
By Stebbins, Blenko & Parmelee
ATTORNEYS

Patented Apr. 21, 1942

2,280,678

UNITED STATES PATENT OFFICE 2,280,678

APPARATUS FOR THE MEASUREMENT OF ELECTRICAL REACTANCE

Henry Waymouth, London, England, assignor to Waymouth Gauges & Instruments Limited, London, England, a British company Application May 28, 1938, Serial No. 210,706
In Great Britain April 19, 1938

3 Claims. (Cl. 175—183)

This invention is for improvements in or relating to apparatus for the measurement of electrical reactance and one application of the invention is to a liquid level indicator comprising a variable reactance.

According to this invention, a device for the measurement of electrical reactance comprises an oscillation generator, a frequency-selective device to which the oscillations are applied, indicating means controlled by the response of the frequency-selective device and means for connecting the reactance to be measured in the circuit of the oscillation generator or frequency-selective device to vary the electrical value thereof whereby the response of the said frequency-selective device is altered to produce an indication of the magnitude of the said reactance on the indicating means. Preferably, the frequency-selective device is a filter comprising a circuit tuned to a frequency at or near the frequency of the oscillation generator and wherein the indicating means is a galvanometer, a movable member of which is so connected to a variable reactance in the circuit of the oscillation generator or in said tuned circuit that movement of said movable member alters the value of said variable reactance to re-establish the frequency-relationship between the oscillation generator and the said filter.

A feature of the invention consists in that the device comprises an oscillation generator arranged for connection to the reactance to be measured so that the frequency of oscillation is changed thereby, a filter to which the oscillations are applied having a sloping characteristic in the region of a frequency which corresponds with one limit of the range of measurement required, means controlled by the response of the filter to vary the frequency of the oscillation generator or the filter characteristic in such a direction that the frequency applied to the filter occupies substantially the same position on the sloping characteristic for different values of the measured reactance and an indicator for the amount of variation of the frequency varying means to provide an indication of the magnitude of the reactance being measured. Preferably, the indicating means comprises a movable member which is mechanically connected to the variable reactance to adjust the value thereof in accordance with the value of the reactance to be measured.

An important feature of the invention consists in that the said oscillation generator comprises a frequency control circuit including a variable inductance constituting the aforesaid variable reactance.

The invention also comprises a liquid level indicator comprising a liquid container, one or more plates arranged within the said container to form a condenser in which the liquid forms the dielectric medium so that variation in the liquid level in the container varies the capacity of said condenser and means for measuring the capacity of said condenser whereby an indication of the liquid level is obtained. Preferably, a number of pairs of plates are disposed perpendicularly to the normal horizontal axis of the liquid container and are disposed along said axis in the middle of equal sections of the container. With this arrangement the liquid container may be tilted to a very considerable angle from its normal position without rendering the indication of the liquid level inaccurate, whilst it will be appreciated that the capacity-measuring means may be calibrated either in units of liquid level or in units of volume.

Figure 9:
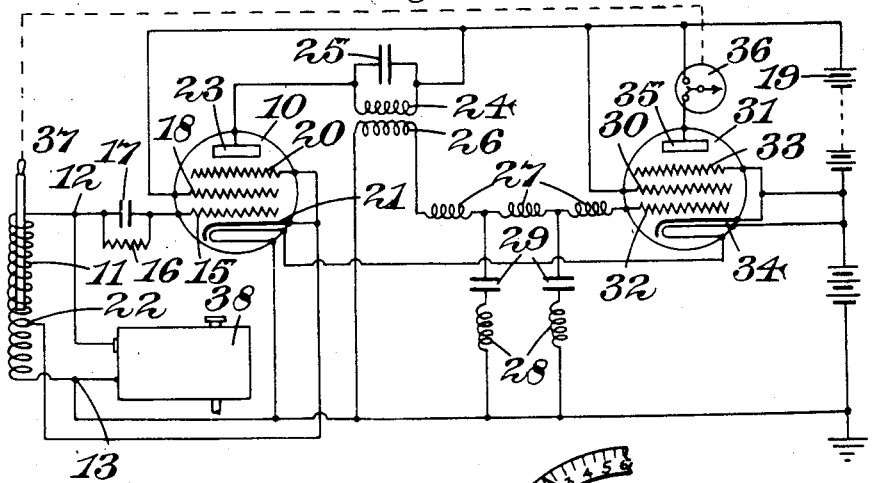
Figure 10:
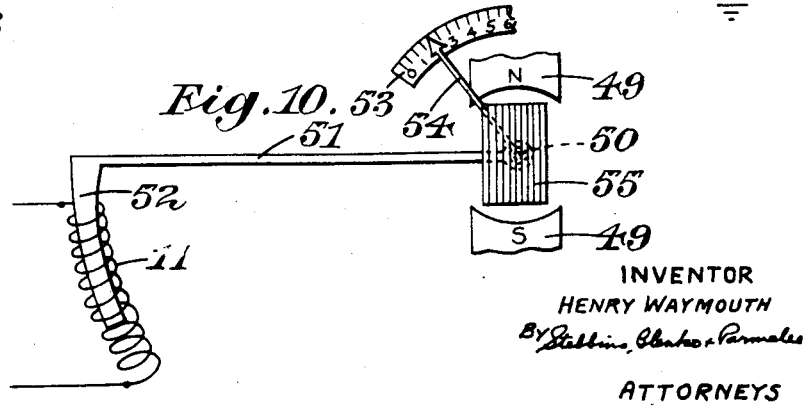

The following is a description of various embodiments of a device for the measurement of electrical reactance in accordance with this invention, reference being made to the accompanying drawings, in which:

Figure 1 is a diagrammatic representation of one arrangement,

Figure 2 is a diagrammatic representation of an arrangement alternative to that of Figure 1, Figure 3 is a diagrammatic representation of an arrangement in which the galvanometer controls the oscillation generator, Figure 4 is an alternative arrangement to that shown in Figure 3, Figure 5 is a diagrammatic representation of an arrangement in which the galvanometer controls the filter, Figure 6 is an alternative arrangement of Figure 5, Figure 7 shows a preferred circuit arrangement corresponding to the diagrammatic arrangement shown in Figure 3, Figure 8 is a diagrammatic representation of one application of the invention as a liquid level indicator, Figure 9 shows the preferred circuit arrangement of Figure 7 as applied to the liquid level indicator of Figure 8, and Figure 10 shows the nature of the connection between the galvanometer and the variable reactance, and the circuit of the oscillation generator or filter of Figures 3, 4, 5, 6, 7 and 9.

Referring to Figure 1 of the drawings, the oscillation generator is a thermionic valve device generating high frequency oscillations which are applied to a filter, the response of which varies with the frequency of the oscillation. The output of the filter is applied to the galvanometer so that when the reactance is connected to the oscillation generator the amount by which the generated frequency varies is indicated by the deflection of the galvanometer and, since the variation in frequency is proportional to the value of the reactance, the deflection of the galvanometer provides a measure of the value of the reactance. Figure 2 is an alternative arrangement to that shown in Figure 1, in which the reactance is connected to the filter circuit so as to alter the characteristics thereof to vary the response of the filter to the applied oscillations in a manner proportional to the value of the reactance, whereby the deflection of the galvanometer provides a measure of the value of the reactance.

Figure 3 is a modification of the arrangement shown in Figure 1 in which the galvanometer is mechanically connected to a variable inductance included in the oscillation generator circuit by means of the connection shown, this mechanical connection being indicated by a dotted line so that the frequency of oscillation generated may be returned to its original value after the reactance has been connected to the oscillation generator. In this arrangement the normal frequency of oscillations generated is at or about the cut-off value of the filter so that when the reactance to be measured is placed in circuit, the filter passes a current which is applied to the galvanometer and deflects it; the movement of the galvanometer controls a variable reactance in the oscillation generator to alter the frequency back to the cut-off value, so that the galvanometer may come to a position of rest, and the reading thereof then provides a measure of the value of the reactance to be measured.

Figure 4 shows an alternative arrangement to that of Figure 3 in which the reactance to be measured is connected in the filter circuit to alter the cut-off value thereof, so that the response of the filter to the oscillations applied by the oscillation generator is varied to enable a current to pass and influence the galvanometer to provide a deflection. As in Figure 3, the movement of the galvanometer controls the frequency of the oscillation generator to bring it back to the cut-off value of the filter so that the galvanometer needle comes to a position of rest and provides a measure of the value of the reactance.

Figure 5 is an alternative arrangement similar to that of Figure 3, in which the galvanometer movement is utilised to control the cut-off value of the filter, by means of the connection which is indicated by a dotted line, so as to cut off the altered oscillation frequency emitted by the oscillation generator when the reactance to be measured has been coupled thereto, and the deflection of the galvanometer needle provides a measure of the value of the reactance.

Figure 6 is an alternative construction to that of Figure 4 in which, as in the arrangement of Figure 5, the galvanometer movement is utilised to vary the cut-off value of the filter.

The circuit arrangement shown in Figure 7 comprises an oscillation generator circuit embodying a thermionic valve 10, a variable inductance 11 and contacts 12 and 13 to which a capacity 14 to be measured is connected. The capacity 14 corresponds with the reactance shown in Figure 3 and contact 12 is connected to the grid 15 of the valve 10 through a grid-leak arrangement comprising a resistance 16 and a condenser 17. The grid 18 of the valve is connected to the positive terminal 19 of a high-tension battery, and the grid 20 of the valve is connected to the cathode 21 and to a tapping 22 in the inductance coil 11. The plate 23 of the valve is connected to a broadly tuned circuit comprising an inductance 24 and a condenser 25 and thence to the positive terminal 19 of a high-tension battery. Coupled with the coil 24 is a coil 26, one side of which is connected to earth and the other side of which is connected to series inductances 27 having shunt tuned circuits comprising inductances 28 and condensers 29. The series inductance remote from the coil 26 is connected to the grid 30 of a thermionic rectifying and amplifying valve 31, a grid 32 of which is connected to the positive terminal 19 of the aforesaid high-tension battery, whilst a grid 33 is connected to the cathode 34 and thence to earth. A plate 35 of the valve is connected to one terminal of the galvanometer 36, the other terminal of which is connected to the positive terminal of the high-tension battery. The moving coil of the galvanometer 36 is mechanically connected to a powdered iron core 37 disposed within the field of the inductance 11 by a connection indicated by the dotted line. Details of the mechanical connection are shown in Figure 10.

The operation of the device is as follows: The frequency of oscillation generated by the thermionic valve 10 and the inductance 11, when there is no condenser 14 in the circuit, is above the cut-off value of the filter composed of the inductances 27 and 28 and the condensers 29, and the rectifying and amplifying valve 31 is arranged to operate so that under these conditions no current is passing in the plate circuit of the valve, and the galvanometer 36 is therefore not energised and the induction it provides in this position is arranged to be outside the calibrated range of the instrument so that the presence of any faulty connection in the circuit, including the reactance to be measured, (the capacity 14) is immediately obvious. When the capacity 14 is connected to the connections 12 and 13 and parallel with the variable inductance 11 in the oscillation generator circuit, the frequency of oscillation is lowered, and this lowered frequency falls below the limit of the aforesaid filter. The oscillations now pass the filter and are impressed upon the grid 30 of the valve 31 and as a result a current flows in the plate circuit of the valve 31, energising the moving coil of the galvanometer and causing it to rotate. During this rotation of the moving coil of the galvanometer, the movable core 37 within the inductance is moved by means of the mechanical connection indicated by a dotted line so as to be partly withdrawn from the field of the inductance 11 so as to cause the frequency generated in the valve 10 to be raised until the frequency reaches the cut-off point of the filter. At this point, there will again obtain the original frequency relationship between the oscillation generator and the low pass filter and the current in the plate circuit of the detecting valve will fall to a value which is only just sufficient to overcome the restoring force acting on the moving coil of the instrument which will, therefore, come to a position of rest. Since the alteration in the frequency which has been made in the oscillation generator is proportional to the value of the capacity 14, the deflection of the galvanometer provides a measure of the value of the reactance and the galvanometer may be calibrated in units of capacity so that a direct reading of the value of the capacity undergoing measurement may be obtained on the instrument.

The application of the device as a liquid level indicator will now be described with reference to Figures 8 and 9.

A liquid container 38 comprises a tank having the usual inlet and outlet connections 39 and 40 and may be of any desired shape, such as a hollow cylindrical vessel. In the interior of the container 38 there are provided three plates 41 which are secured to the walls 42 of the container in any desired manner. Carried upon the plates 41 by means of insulating bushes 44 are the plates 43 so as to form condenser elements in which the dielectric medium is constituted by the liquid in the container, for example, petrol. It will be appreciated that a variation in the level of the liquid within the container will vary the capacity of the plates owing to the alteration in the dielectric medium between them.

The three plates 43 are connected together by means of a connecting wire 45 which may be arranged to pass through the bushes which are made hollow at 46. The connection is passed through the wall 47 of the container by means of a sealed insulating bush 48 and this connection is led to the oscillation generator of a capacity measuring device similar to that shown in Figure 3 of the drawings, in which the condenser plates 41, 43 constitute the reactance shown in Figure 3. The operation of the indicator is as follows: As the liquid level in the container 38 rises, the capacity value of the condenser formed by the plates 41, 43 increases, and consequently, the frequency of oscillation generated by the oscillation generator falls. As described in connection with the circuit diagram of Figure 7, the fall in frequency causes the galvanometer to be deflected, and the deflection of the galvanometer is arranged as hereinbefore described, to alter the frequency generated by the oscillation generator back to its original value so that the galvanometer may come to rest in a position which may be calibrated to indicate the level of the liquid. As the level of the liquid continues to rise in the container 38, the capacity value of the condenser 41, 43 increases still further and the cycle of operations is repeated, and the galvanometer comes to rest in a different position corresponding to the new liquid level.

Conversely, if the liquid level in the tank were to fall, the capacity of the condenser formed by the plates 41, 43 would be diminished and the frequency of the oscillation generator would therefore rise. It would then be appreciated that the filter will operate to reduce the current flowing through the galvanometer to a value which is below that which is necessary to overcome the restoring force of the galvanometer, which consequently will be moved in a direction opposite to that already described; in so doing, it will be appreciated that the rotation of the moving coil of the galvanometer will cause the iron core to be moved further into the field of the inductance 11 (shown in Figure 7) thereby reducing the frequency of the oscillations generated by the valve 18 so that the response of the filter is again altered so that the current flowing through the galvanometer again reaches the point at which it balances the restoring force of the galvanometer.

It will be appreciated that the restoring force of the galvanometer may be of a very small magnitude.

Figure 9 shows the circuit arrangement of Figure 7, wherein there is substituted for the condenser 14 the liquid container 38, the plates 41 and 43 of which constitute the capacity 14 of Figure 7.

Figure 10 is a diagrammatic representation of the mechanical connection between the galvanometer and the variable reactance which has hereinbefore been referred to as "the mechanical connection indicated by a dotted line."

The galvanometer comprises a moving coil 55 moving between magnet poles 49. The moving coil is carried upon a shaft 56 upon which there is mounted the arm 51. On the end of the arm remote from the bearing 50 there is mounted an iron core 52 corresponding to the diagrammatic representation of the iron core 37 in Figures 7 and 9, which core is arranged to be moved into and out from the axis of the inductance 11 by the rotation of the moving coil 55. It will be appreciated that by varying the cross-section of the core 52, the scale of graduations 53, over which the pointer 54 moves, may be varied for instance by making the core of tapering cross-section; in this way the distance between the graduations 53 on the scale may be widened at one end of the scale; this effect may be also obtained by varying the spacing of the winding at one end of the inductance or alternatively by using a fixed series condenser in circuit therewith. In the instance shown in Figure 10, the graduations towards the lower end of the range of measurement will be separated more widely than graduations at the upper end of the range of measurement. The scale may be graduated in units of capacity, units of liquid level or units of liquid volume as required.

I claim:

1. Apparatus for measuring an electrical capacity, comprising a generator of electric oscillations, said generator having a frequency control circuit comprising a variable reactance and a condenser, the capacity of which is to be measured, frequency responsive means to which said oscillations are applied, and a galvanometer energized according to the output of said frequency responsive means and having a biased pivotal indicating member, said reactance having a movable reactance varying member rigid with said indicating member for movement therewith to vary the reactance in the sense to oppose a change of frequency of said oscillations produced by a change of capacity of the condenser.

2. Apparatus for measuring an electrical capacity, comprising a generator of electric oscillations, said generator having a frequency control circuit comprising a variable reactance and a condenser, the capacity of which is to be measured, a filter to which said oscillations are applied having a sloping frequency-amplitude characteristic for a range of frequencies produced by variations of said condenser capacity and said variable reactance and a galvanometer connected to said filter and having a pivotal indicating member moved through a distance depending on the amplitude of the output of said filter, said variable reactance having a movable reactance varying member rigid with said indicating member for movement therewith to vary the reactance in the sense to oppose a change of frequency of said oscillations produced by a change of capacity of the condenser.

3. Apparatus for indicating variations of an electrical reactance comprising a generator of electric oscillations controlled as to frequency by said reactance, a filter to which said oscillations are applied, said filter having a sloping frequency-amplitude characteristic for an operative range of frequency of said oscillations, a galvanometer connected to said filter and having a pivotal indicating member moved through a distance depending on the amplitude of the output of said filter and a frequency varying member for said generator rigid with said indicating member for movement therewith to oppose a change of frequency produced by variations of said reactance.

HENRY WAYMOUTH.